United States Patent
Shinoda et al.

(10) Patent No.: US 10,474,913 B2
(45) Date of Patent: Nov. 12, 2019

(54) RECORDING DEVICE AND RECORDING METHOD

(71) Applicant: Panasonic Intellectual Property Management Co., Ltd., Osaka (JP)

(72) Inventors: Toru Shinoda, Tokyo (JP); Akio Furuta, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/082,560

(22) PCT Filed: Feb. 15, 2017

(86) PCT No.: PCT/JP2017/005490
§ 371 (c)(1),
(2) Date: Sep. 6, 2018

(87) PCT Pub. No.: WO2017/159186
PCT Pub. Date: Sep. 21, 2017

(65) Prior Publication Data
US 2019/0115049 A1 Apr. 18, 2019

(30) Foreign Application Priority Data
Mar. 18, 2016 (JP) .................... 2016-056105

(51) Int. Cl.
*G06K 9/00* (2006.01)
*G07C 5/00* (2006.01)
(Continued)

(52) U.S. Cl.
CPC ..... *G06K 9/00832* (2013.01); *G06K 9/00845* (2013.01); *G07C 5/00* (2013.01);
(Continued)

(58) Field of Classification Search
USPC .......................... 386/223–228, 248
See application file for complete search history.

(56) References Cited

U.S. PATENT DOCUMENTS 9,387,813 B1* 7/2016 Moeller ............... B60R 11/04
2002/0140562 A1 10/2002 Gutta et al.
(Continued)

FOREIGN PATENT DOCUMENTS

JP 2004-519788 7/2004
JP 2006-295676 10/2006
(Continued)

OTHER PUBLICATIONS

International Search Report of PCT application No. PCT/JP2017/005490 dated May 23, 2017.

*Primary Examiner* — Nigar Chowdhury
(74) *Attorney, Agent, or Firm* — Greenblum & Bernstein, P.L.C.

(57) ABSTRACT

A recording device includes a receiver, a recorder, and first and second selectors. The receiver is to be connected to a vehicle exterior imaging device and a vehicle interior imaging device, and receives vehicle exterior images and vehicle interior images generated in time series from the vehicle exterior imaging device and the vehicle interior imaging device, respectively. The recorder records the vehicle exterior images and the vehicle interior images received by the receiver. The first and second selectors respectively select a first image and a second image from the vehicle exterior images or the vehicle interior images recorded in the recorder. The first image indicates a first behavior previously determined as having an apparent risk in a behavior of the vehicle or the occupant. The second image indicates a second behavior previously determined as having a potential risk in a behavior of the vehicle or the occupant.

6 Claims, 6 Drawing Sheets

(51) Int. Cl.
*H04N 5/91* (2006.01)
*H04N 7/18* (2006.01)
*H04N 5/77* (2006.01)

(52) U.S. Cl.
CPC ................. *H04N 5/77* (2013.01); *H04N 5/91* (2013.01); *H04N 7/18* (2013.01); *H04N 7/181* (2013.01)

(56) References Cited

U.S. PATENT DOCUMENTS

| | | | | |
|---|---|---|---|---|
| 2011/0074916 | A1* | 3/2011 | Demirdjian | B60R 1/00 348/36 |
| 2014/0146152 | A1* | 5/2014 | Frashure | G03B 15/00 348/77 |
| 2015/0049184 | A1* | 2/2015 | Hooton | H04N 7/181 348/113 |
| 2016/0031370 | A1* | 2/2016 | McElroy | B60R 1/00 348/148 |
| 2016/0357262 | A1* | 12/2016 | Ansari | G06F 3/017 |
| 2016/0371553 | A1* | 12/2016 | Farnham, IV | G06F 3/04817 |
| 2017/0126680 | A1* | 5/2017 | Yusuf | H04W 12/02 |
| 2017/0251163 | A1* | 8/2017 | Ochiai | H04N 5/232 |

FOREIGN PATENT DOCUMENTS

| | | |
|---|---|---|
| JP | 2012-113609 | 6/2012 |
| JP | 2013-191215 | 9/2013 |
| WO | 2002/080127 | 10/2002 |

\* cited by examiner

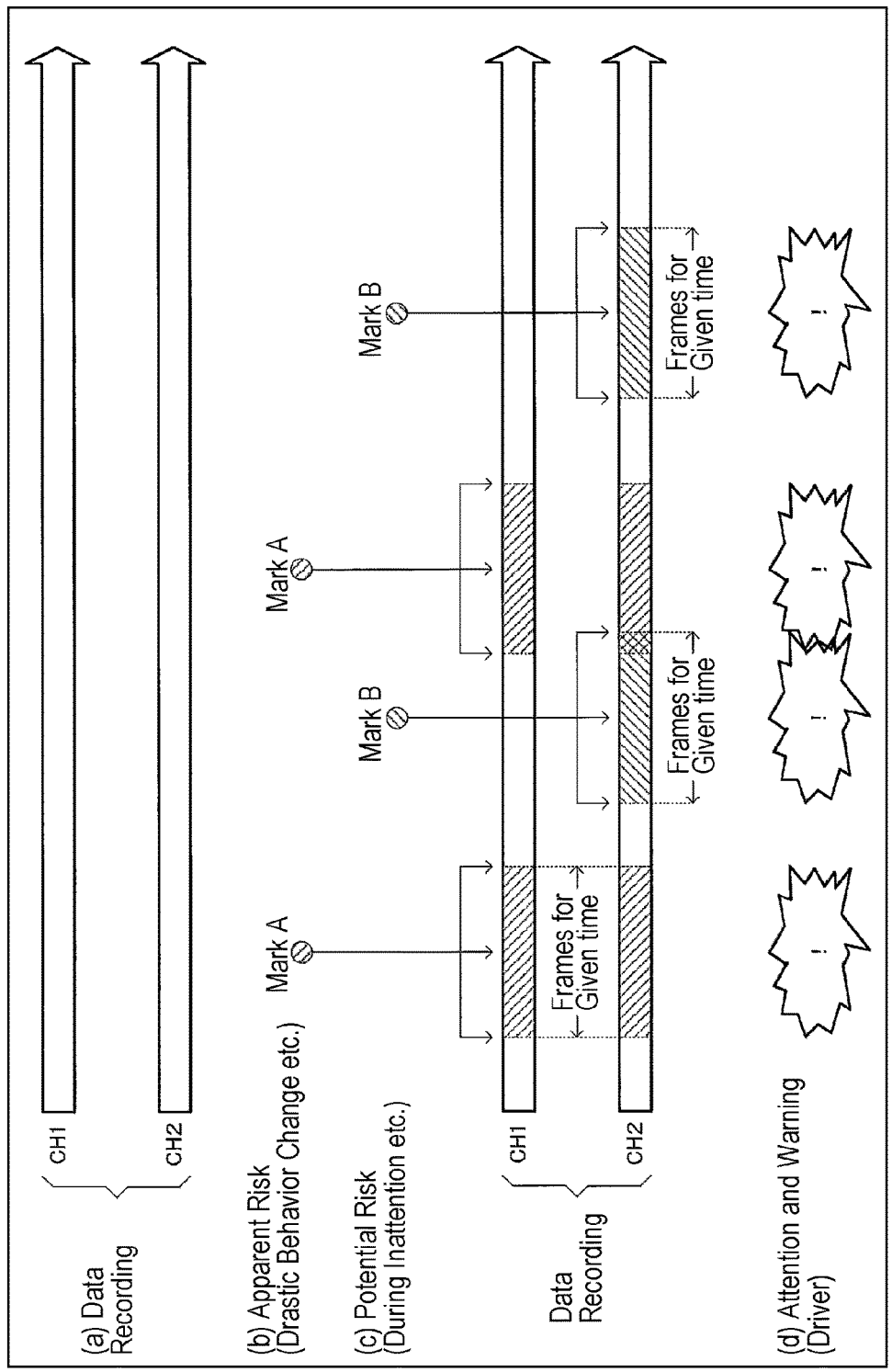

RECORDING DEVICE AND RECORDING METHOD

This application is a U.S national stage application of the PCT International Application No. PCT/JP2017/005490 filed on Feb. 15, 2017, which claims the benefit of foreign priority of Japanese patent application No. 2016-056105 filed on Mar. 18, 2016, the contents all of which are incorporated herein by reference.

TECHNICAL FIELD

The present disclosure relates to a recording device and a recording method for recording a factor of a traffic accident or an incident.

BACKGROUND ART

Recently, a drive recorder becomes popular as described in PTL 1. Such a drive recorder captures and records an image around a vehicle when a driver encounters a traffic accident or a situation (incident) that might lead to the traffic accident during driving of the vehicle.

More specifically, the drive recorder includes a camera that images a situation in front of the vehicle, and records an image captured by the camera in a recording unit when vehicle acceleration detected by an acceleration sensor exceeds an upper limit (that is, when the behavior of the vehicle changes drastically). For example, the recorded image data is used for investigating the cause of an accident in an automobile insurer, or used in the safe driving education of employees (that is, drivers) in a transport service provider.

CITATION LIST

Patent Literature

PTL 1: Unexamined Japanese Patent Publication No. 2006-295676

SUMMARY OF THE INVENTION

The present disclosure provides a recording device and a recording method capable of recording a potential risk.

The recording device of the present disclosure includes a receiver, a recorder, a first selector, and a second selector. The receiver is to be connected to a vehicle exterior imaging device and a vehicle interior imaging device, and receives vehicle exterior images and vehicle interior images from the vehicle exterior imaging device and the vehicle interior imaging device, respectively. The vehicle exterior imaging device images an outside of a vehicle to generate the vehicle exterior images in time series, and the vehicle interior imaging device generates, in time series, the vehicle interior images in which an occupant of the vehicle is imaged. The recorder records the vehicle exterior images and the vehicle interior images received by the receiver. The first selector selects a first image from the vehicle exterior images or the vehicle interior images recorded in the recorder. The first image indicates a first behavior previously determined as having an apparent risk in a behavior of the vehicle or the occupant. The second selector selects a second image from the vehicle exterior images or the vehicle interior images recorded in the recorder. The second image indicates a second behavior previously determined as having a potential risk in a behavior of the vehicle or the occupant.

In the recording method of the present disclosure, vehicle exterior images and vehicle interior images are received from a vehicle exterior imaging device and a vehicle interior imaging device to record the vehicle exterior images and the vehicle interior images in a recorder. The vehicle exterior imaging device images an outside of a vehicle to generate the vehicle exterior images in time series. The vehicle interior imaging device generates, in time series, the vehicle interior images in which an occupant of the vehicle is imaged. Then, a first image is selected from the vehicle exterior images or the vehicle interior images recorded in the recorder. The first image indicates a first behavior previously determined as having an apparent risk in a behavior of the vehicle or the occupant. On the other hand, a second image is selected from the vehicle exterior images or the vehicle interior images recorded in the recorder. The second image indicates a second behavior previously determined as having a potential risk in a behavior of the vehicle or the occupant.

The present disclosure can provide the recording device and the recording method capable of recording the potential risk.

BRIEF DESCRIPTION OF DRAWINGS

FIG. 4A is a schematic diagram illustrating data recording performed by the recording device shown in FIG. 1.

DESCRIPTION OF EMBODIMENTS

Prior to describing exemplary embodiments of the present disclosure, problems of the conventional drive recorder are briefly described. The conventional drive recorder does not record the captured image as long as the drastic change of the vehicle behavior does not become apparent. Alternatively, the recording is always performed irrespective of the vehicle behavior or a risk. However, sometimes a potentially risky behavior that does not appear in the vehicle behavior leads to the traffic accident.

Hereinafter, exemplary embodiments of the present disclosure will be described with reference to the accompanying drawings.

<1. First Exemplary Embodiment>

Recording device 5 according to a first exemplary embodiment of the present disclosure will be described in detail below with reference to FIGS. 1 to 4B.

<1-1. Basic Configuration of Recording Device 5>

Figure 1:
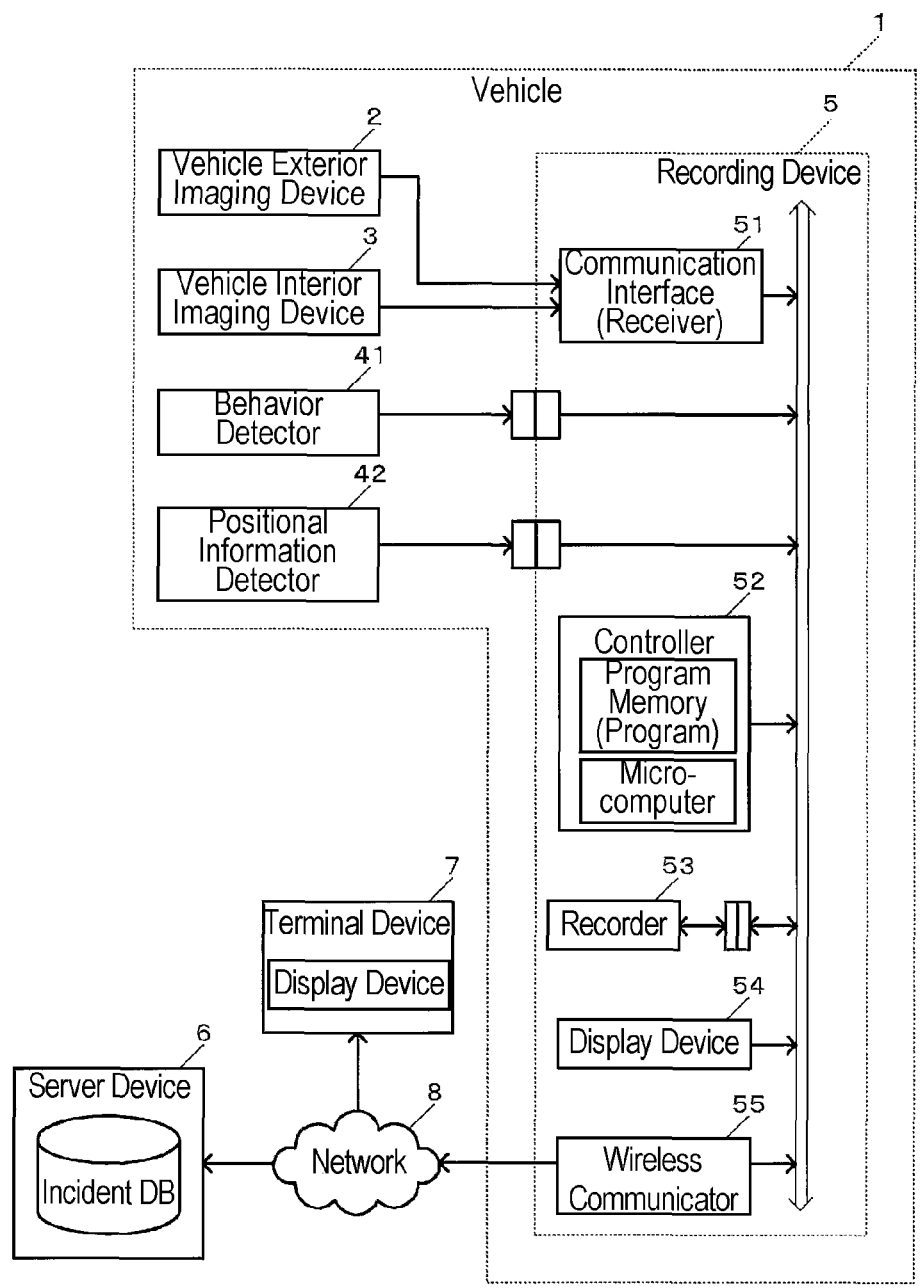
FIG. 1 is a block diagram illustrating a hardware configuration of a recording device according to a first exemplary embodiment of the present disclosure.

Referring to FIG. 1, vehicle exterior imaging device 2 and vehicle interior imaging device 3 (hereinafter, referred to as imaging devices 2, 3), behavior detector 41, positional information detector 42, and recording device 5 are mounted to vehicle 1.

Typically, imaging devices 2, 3 are cameras each in which a solid-state imaging element such as a CMOS image sensor and a CCD image sensor is used. Imaging devices 2, 3 are connected to communication interface 51 included in recording device 5.

Imaging device 2 is attached to a position (for example, an upper portion of a windshield) where surroundings of vehicle 1 (typically, a situation in front of vehicle 1) can be imaged. Imaging device 2 generates, at a predetermined frame rate, vehicle exterior images in which the situation in front (forward direction) of vehicle 1 is imaged, and transmits the vehicle exterior images to recording device 5 along time series.

Imaging device 3 is attached to a position (such as surroundings of a speed meter and surroundings of a boundary between a windshield and a roof) where at least one of a driver and fellow passengers of vehicle 1 can be imaged. In the first exemplary embodiment, the driver and the fellow passengers are collectively referred to as an occupant. Imaging device 3 generates, at a predetermined frame rate, vehicle interior images in which the occupant is imaged, and transmits the vehicle interior images to recording device 5 along time series.

For example, behavior detector 41 includes at least one of a steering angle sensor and an acceleration sensor. The steering angle sensor or the acceleration sensor is connected to a connector provided in recording device 5. The steering angle sensor detects a steering angle of vehicle 1, and periodically transmits, to recording device 5, signals (hereinafter, each of them is simply referred to as a steering angle θ) each indicating a detection result. The acceleration sensor detects acceleration (including deceleration) applied to vehicle 1, and periodically transmits, to recording device 5, signals (hereinafter, each of them is simply referred to as acceleration α) each indicating a detection result.

Positional information detector 42 catches a vehicle traveling position based on latitude and longitude information received from at least one of a GPS (Global Positioning System), a communication base station for a mobile phone, and an ITS (Intelligent Transport Systems) spot on a road.

In the present exemplary embodiment, for example, recording device 5 is an Electronic Control Unit (ECU), and is disposed in vehicle 1. In addition to communication interface 51, recording device 5 includes controller 52, recorder 53, display device 54, and wireless communicator 55.

Communication interface 51 is a typical example of a receiver. Communication interface 51 sequentially receives the vehicle exterior images from imaging device 2 frame by frame to record the vehicle exterior images in first recording area (CH1) (see FIG. 2) of recorder 53, and sequentially receives the vehicle interior images from imaging device 3 frame by frame to record the vehicle interior images in second recording area (CH2) (see FIG. 2) of recorder 53. At the same time, controller 52 records vehicle positional information acquired by positional information detector 42 while adding the vehicle positional information to the corresponding frame as metadata.

Figure 2:
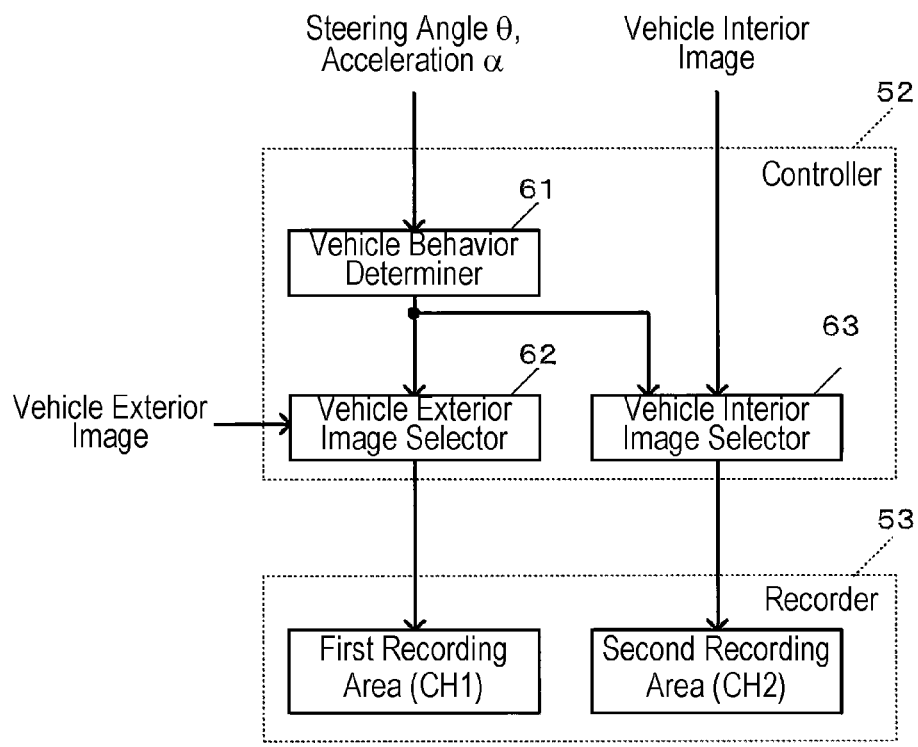
FIG. 2 is a functional block diagram of the recording device shown in FIG. 1.

Controller 52 roughly includes a program memory and a microcomputer. As illustrated in FIG. 2, the microcomputer acts as vehicle behavior determiner 61, vehicle exterior image selector 62, and vehicle interior image selector 63 by executing a program previously stored in the program memory. Vehicle behavior determiner 61, vehicle exterior image selector 62, and vehicle interior image selector 63 may be implemented as program modules (that is, a software components) in which data can be transmitted and received by a program interface.

Recorder 53 is constructed with a hard disk, a flash memory, or the like. Recorder 53 may be incorporated in recording device 5, or may be a portable type insertable in and removable from recording device 5. As illustrated in FIG. 2, the recording area of recorder 53 is logically divided into first recording area (CH1) and second recording area (CH2).

Display device 54 is a liquid crystal display or the like. For example, display device 54 displays some of the vehicle exterior images and the vehicle interior images recorded in recorder 53 under the control of controller 52.

For example, wireless communicator 55 uploads the vehicle exterior images or vehicle interior images recorded in recorder 53 to server device 6 through network 8 under the control of controller 52.

<1-2. Operation of Recording Device 5>

A processing procedure and a processing content of controller 52 will be described in detail below with reference to FIGS. 3, 4A, and 4B.

Figure 3:
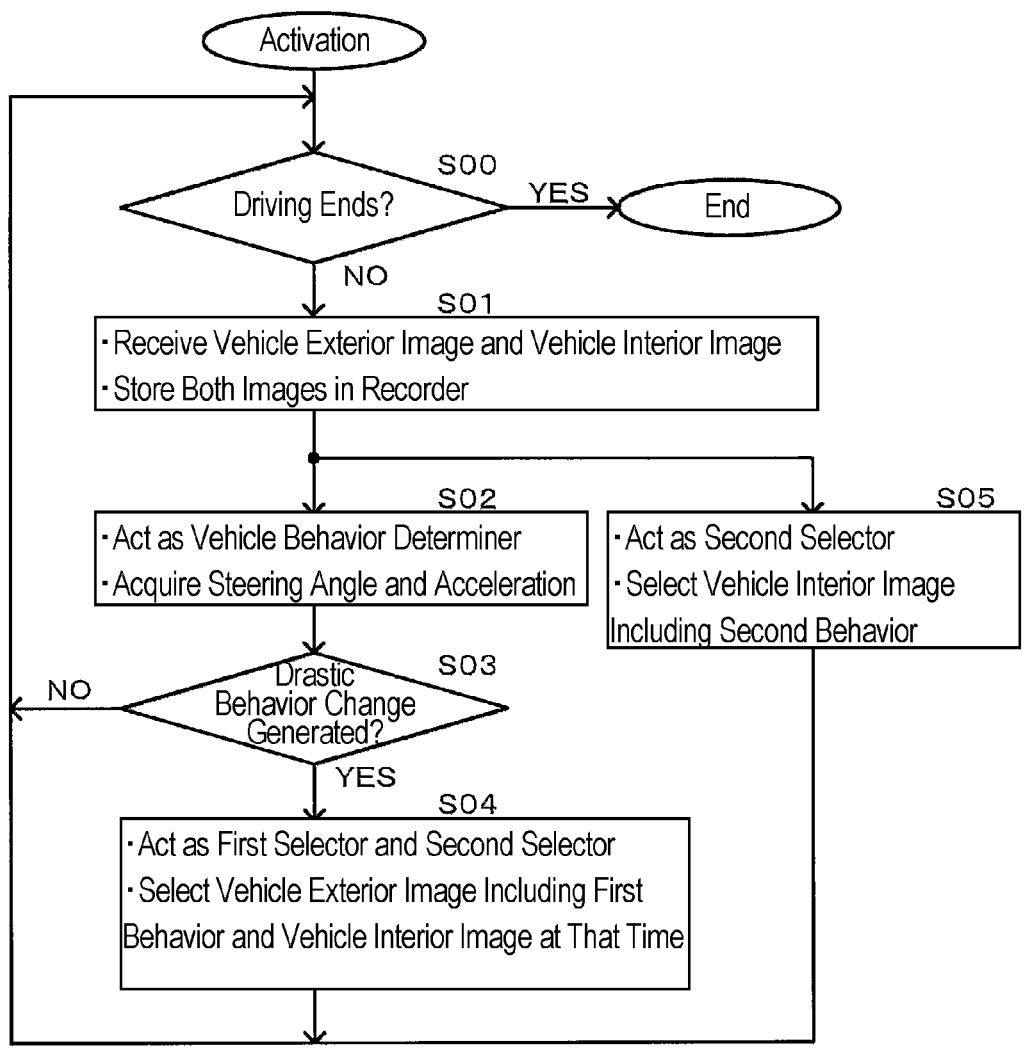
FIG. 3 is a flowchart illustrating a processing procedure of the recording device shown in FIG. 1.
Figure 4B:
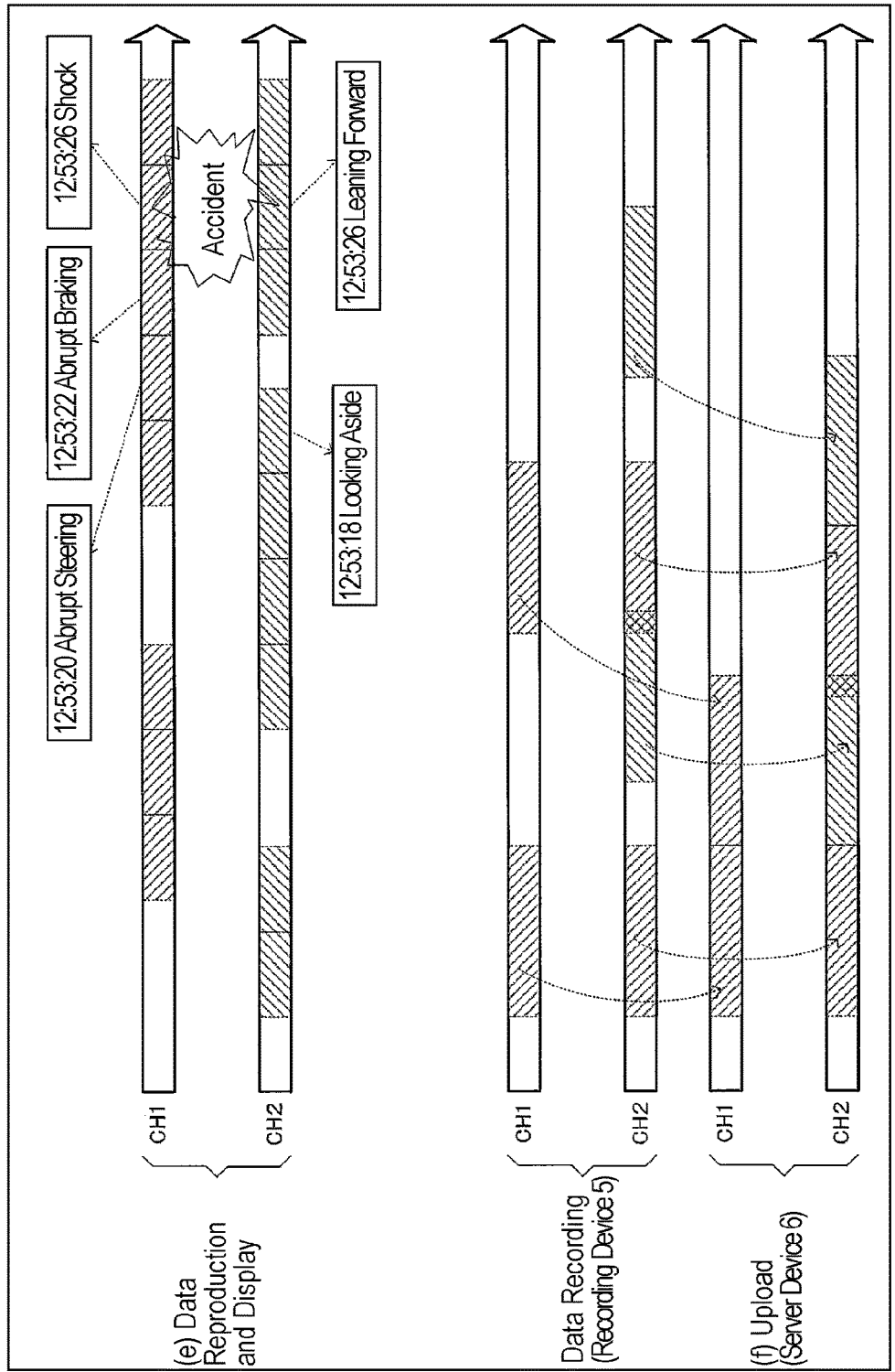
FIG. 4B is a schematic diagram illustrating data usage performed by the recording device shown in FIG. 1.

Referring to FIG. 3, recording device 5 is activated by starting driving of vehicle 1. First, controller 52 determines whether or not the driving is ended (step S00). Recording device 5 performs ending processing upon an affirmative determination.

On the other hand, when a negative determination is made in step S00, in recording device 5, communication interface 51 that is the receiver receives the vehicle exterior images transmitted from imaging device 2 at a predetermined frame rate, and records the vehicle exterior images in first recording area (CH1). When an empty area is absent in first recording area (CH1), a vehicle exterior image which is already recorded in first recording area (CH1) and does not indicates the first behavior (that is, the vehicle exterior image to which a first mark A (to be described later) is not added), is overwritten by a newly-received vehicle exterior image. Communication interface 51 records the vehicle interior images transmitted from imaging device 3 in second recording area (CH2) similarly to the vehicle exterior images (see step S01 in FIG. 3, and "(a) Data Recording" in FIG. 4A).

Controller 52 acts as vehicle behavior determiner 61, and acquires the steering angle θ and the acceleration α from behavior detector 41 (step S02).

Vehicle behavior determiner 61 determines whether or not the behavior of vehicle 1 changes drastically based on information obtained in step S02 (step S03). Specifically, for example, in the case where an absolute value of the steering angle θ exceeds 45°, or in the case where an absolute value of the acceleration α exceeds 0.25 G, vehicle behavior determiner 61 determines that the behavior of vehicle 1 changes drastically. For example, the steering angle θ is detected as steering angle with a reference when vehicle 1 goes straight on. Vehicle behavior determiner 61 returns to step S00 upon the negative determination in step S03. On the other hand, vehicle behavior determiner 61 transfers a determination result to vehicle exterior image selector 62 upon the affirmative determination in step S03.

Controller 52 acts as vehicle exterior image selector 62 that is an example of a first selector. Vehicle exterior image selector 62 selects a vehicle exterior image indicating the first behavior previously determined as having an apparent risk in the behavior of vehicle 1 among the vehicle exterior images recorded in first recording area (CH1) (step S04).

In the present exemplary embodiment, the apparent risk means a factor of a traffic accident or an incident (hereinafter, referred to as a traffic accident or the like), and is a risk appearing in the detection result of behavior detector 41 as a clear numerical value of a drastic behavior change of vehicle 1. The behavior is previously determined as the first behavior in the first exemplary embodiment.

In the vehicle exterior images recorded in first recording area (CH1), vehicle exterior image selector 62 adds, an example of the metadata, first mark A to the frame of the vehicle exterior image corresponding to an own determination result (that is, the vehicle exterior image at a detection time of the drastic behavior change) and the frames for a given time before and after the detection time of the drastic behavior change (see "(b) Apparent Risk" in FIG. 4A). Consequently, the frame of the vehicle exterior image indicating the first behavior and other frames are distinguished from each other in first recording area (CH1). Similarly, first mark A is added to the vehicle interior images recorded in second recording area (CH2).

In step S04, controller 52 also acts as vehicle interior image selector 63 that is an example of a second selector. Vehicle interior image selector 63 selects a vehicle interior image at the detection time of the drastic behavior change among the vehicle interior images recorded in second recording area (CH2).

Vehicle interior image selector 63 adds, as an example of the metadata, first mark A to the frame of the vehicle interior image selected in second recording area (CH2) and the frames for a given time before and after the selected frame (see "(b) Apparent Risk" in FIG. 4A). Consequently, the vehicle interior image at the detection time of the first behavior and the vehicle interior images before and after the detection time are recorded in second recording area (CH2) together with first mark A.

At the same time, controller 52 records the vehicle positional information acquired by positional information detector 42 while adding, as metadata, the vehicle positional information to at least one of the frames of the corresponding vehicle exterior image and vehicle interior image.

When step S04 is ended, the processing returns to step S00. Controller 52 performs step S05 in concurrent with steps S01 to S04. Step S05 may be performed before and after a series of pieces of processing in steps S01 to S04.

Controller 52 acts as vehicle interior image selector 63 that is an example of the second selector. Vehicle interior image selector 63 selects the vehicle interior image indicating the second behavior previously determined as having a potential risk in a behavior of the occupant from the vehicle interior images recorded in second recording area (CH2) (step S05).

In the present exemplary embodiment, the potential risk means the factor of the traffic accident or the like that does not appear as the drastic behavior change of vehicle 1. As an example of this kind of potential risk, situations can be cited, such as inattentive driving, driving while the steering wheel is released from a hand for a long time, and long-time operation (for example, one and a half minutes) of a mobile phone, in which the occupant does not concentrate on the driving of vehicle 1 much. Such behaviors of the occupant are determined as the second behavior in the present exemplary embodiment.

Vehicle interior image selector 63 can detect the second behavior by performing known image recognition processing on each of the vehicle interior images recorded in second recording area (CH2). In the vehicle interior images recorded in second recording area (CH2), vehicle interior image selector 63 adds, as an example of the metadata, second mark B to the frame of the vehicle interior image corresponding to an own recognition result (that is, the vehicle interior image at a recognition time of the second behavior) and the frames for a given time before and after the recognition time. Consequently, the frame of the vehicle interior image indicating the second behavior and other frames are distinguished from each other in second recording area (CH2) (see "(c) Potential Risk" in FIG. 4A).

Even in step S05, controller 52 preferably records the vehicle positional information acquired by positional information detector 42 while adding, as metadata, the vehicle positional information to the frame of the corresponding vehicle interior image.

Various behaviors can be defined as the second behavior based on intension of a design developer or a user of recording device 5. A plurality of risk levels different from each other can be previously determined in the second behavior. Vehicle interior image selector 63 can assign the previously-determined risk level to the vehicle interior image to which second mark B is added as an example of the metadata.

In detecting the first behavior or the second behavior, recording device 5 may issue a warning to the occupant (in particular, the driver) using warning sound such that the occupant concentrates on the driving of vehicle 1 (see "(d) Attention and Warning (Driver)" in FIG. 4A). When step S05 is ended, the processing returns to step S00.

In recording device 5, display device 54 displays some of the vehicle exterior images and the vehicle interior images recorded in recorder 53 under the control of controller 52. In the present exemplary embodiment, time information such as a known time stamp is added to the frames of the vehicle exterior images and the vehicle interior images, so that preferably controller 52 synchronously reproduces one of the vehicle exterior images and one of vehicle interior images recorded in recorder 53, and displays the ones on display device 54 (see "(e) Data Reproduction and Display" in FIG. 4B). At this point, controller 52 can reproduce only the vehicle interior image to which the risk level previously set by the user is added.

In recording device 5, controller 52 accesses remote server device 6 at predetermined timing, reads the vehicle exterior image and the vehicle interior image to which first mark A is added and the vehicle interior image to which second mark B is added from recorder 53, and uploads the images through wireless communicator 55. Server device 6 records the received vehicle exterior image and the vehicle interior images in an incident database (DB) (see "(f) Upload" in FIG. 4B). Similarly to the conventional case, the vehicle exterior image and vehicle interior images recorded in incident DB are used by an automobile insurer or a transport service provider. Similarly to the previous description, preferably terminal device 7 on the user (the automobile insurer or the motor carrier) side synchronously reproduces the vehicle exterior image and the vehicle interior image, and displays the images on the display device (see "(e) Data Reproduction and Display" in FIG. 4B). At this point, controller 52 can reproduce only the vehicle interior image to which the risk level previously set on the user side is added. The vehicle exterior image and the vehicle interior image include positional information, thus, a track (or trajectory) of vehicle 1 can simultaneously be displayed on a map. Consequently, for example, the automobile insurer can observe the vehicle exterior image and vehicle interior image (the frame to which first mark A is added) and the vehicle interior image (the frame to which second mark B is added), which have a high possibility relating to the traffic accident, and needs not to observe the images having a low possibility. Therefore, the automobile insurer can efficiently verify the traffic accident. The vehicle exterior image and the vehicle interior image (the frame to which first mark A is added) and the vehicle interior image (the frame to which second mark B is added), which have a high possibility relating to the traffic accident, can simultaneously checked. Therefore, the verification of the traffic accident can efficiently be performed. That is, when and what something has happened outside the vehicle, and when and what something has happened inside the vehicle can efficiently be checked using recording device 5.

As described above, the second behavior is one of the plurality of second behaviors with which the plurality of risk levels different from each other are determined. The second image is one of the plurality of second images. In this case, controller 52 may reproduce the second image indicating one of the plurality of second behaviors among the plurality of second images recorded in recorder 53. To the plurality of second behaviors, the previously-set risk levels are determined.

<1-3. Action and Effect of Recording Device 5>

As described above, according to recording device 5, because the factor of the traffic accident or the like that does not appear in the vehicle behavior can be recorded in recorder 53, as compared with the conventional cases, an accident cause can be explicated to contribute to construction of the incident DB usable in better safe driving education.

<1-4. Appendix>

In the present exemplary embodiment, the apparent risk is the factor of the traffic accident or the like, and is the risk that appears as the drastic behavior change of vehicle 1, and such the behavior is the first behavior. On the other hand, the behaviors, such as the inattentive driving and the long-time operation (for example, one and a half minutes) of the mobile phone, in which the driver does not concentrate on the driving of vehicle 1, are the second behavior as a specific example of the potential risk. Seat belt unworn of the fellow passenger is also exemplified as the second behavior.

However, the present disclosure is not limited thereto, and the apparent risk may be the drastic behavior change of the occupant. The behaviors, such as a gaze at an in-vehicle monitor, the long-time operation (for example, two minutes) of the mobile phone, and the driving while the steering wheel is released from the hand for a long time, in which the driver does not concentrate on the driving of vehicle 1, may be the first behavior. Holding out the hand of the fellow passenger from a window of vehicle 1 is also exemplified as the apparent risk.

The potential risk does not appear in the detection result of behavior detector 41 as the drastic behavior change of vehicle 1. However, the potential risk is sometimes generated as a slight behavior change in vehicle 1, for example, as a fact that an animal or a child appears on the road. Such the behavior may be the second behavior. Such the behavior can be detected by performing the image recognition on the vehicle exterior image.

<2. Second Exemplary Embodiment>

Recording device 5a according to a second exemplary embodiment of the present disclosure will be described in detail below with reference to FIG. 5.

<2-1. Basic Configuration of Recording Device 5a>

Figure 5:
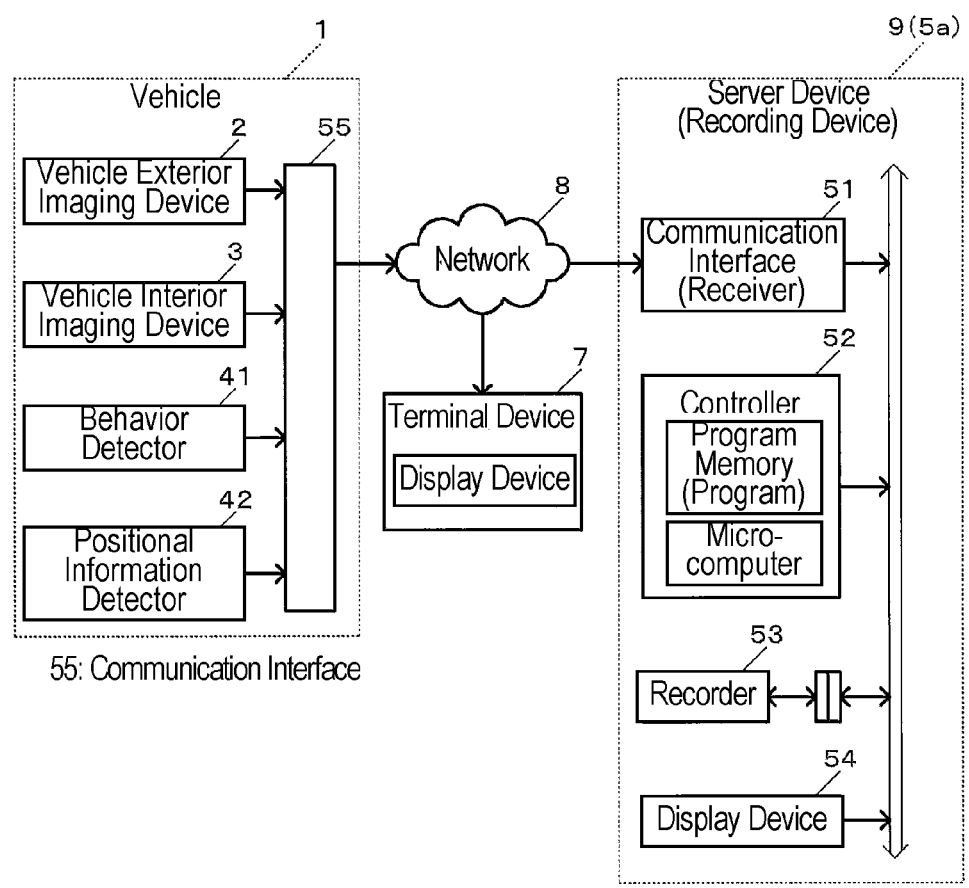
FIG. 5 is a block diagram illustrating a hardware configuration of a recording device according to a second exemplary embodiment of the present disclosure.

In FIG. 5, recording device 5a is substantially similar to recording device 5 except for the following points. Thus, the components in FIG. 5 equivalent to those in FIG. 1 are denoted by the identical reference mark, and the overlapping description is omitted.

Recording device 5a is incorporated in server device 9 installed on network 8, but recording device 5a does not include wireless communicator 55. In recording device 5a, communication interface 51 receives the vehicle exterior images and the vehicle interior images respectively from imaging devices 2 and 3 mounted to vehicle 1 through network 8. As necessary, communication interface 51 also receives the pieces of information obtained by behavior detector 41 and positional information detector 42 mounted to vehicle 1 through network 8. Based on the vehicle exterior image, the vehicle interior image, and the pieces of information, controller 52 records the vehicle exterior images and the vehicle interior images in recorder 53 in the same manner as sections 1-2 and 1-4. In the second exemplary embodiment, recorder 53 constitutes the incident DB of the first exemplary embodiment.

INDUSTRIAL APPLICABILITY

The recording device and the recording method of the present disclosure can record the factor of the traffic accident or incident that does not appear in the vehicle behavior, and are useful in the drive recorder, the server device on the network, and the like.

REFERENCE MARKS IN THE DRAWINGS 1 vehicle
2 vehicle exterior imaging device (imaging device)
3 vehicle interior imaging device (imaging device)
41 behavior detector
42 positional information detector
5, 5a recording device
51 communication interface (receiver)
52 controller
53 recorder
54 display device
55 wireless communicator
6, 9 server device
61 vehicle behavior determiner
62 vehicle exterior image selector
63 vehicle interior image selector
7 terminal device
8 network

The invention claimed is:

1. A recording device comprising:
a receiver configured to be connected to an ambient imaging device and an in-vehicle imaging device, the ambient imaging device generating ambient images of a vehicle in time series, the in-vehicle imaging device generating in-vehicle images of the vehicle in time series, the in-vehicle images including an image of an occupant of the vehicle;
a recorder configured to record the ambient images and the in-vehicle images received by the receiver; and
a display,
wherein the recording device selects a first image from the recorded images, the recorded images including the ambient images recorded in the recorder and the in-vehicle images recorded in the recorder, the first image indicating a first behavior corresponding to an apparent risk to the vehicle, the first behavior including at least one of a behavior of the vehicle or a behavior of the occupant of the vehicle, and the apparent risk corresponding to a behavior change of the vehicle,
wherein the recording device selects a second image from the in-vehicle images recorded in the recorder, the second image indicating a second behavior corresponding to a potential risk stemming from a behavior of the occupant of the vehicle, the potential risk not corresponding to the behavior change of the vehicle, the second behavior being classified into one of a first risk level or a second risk level different from the first risk, and wherein the display is configured to display the second image of the second behavior corresponding to the second risk level of the potential risk, and configured not to display the second image corresponding to first risk level of the potential risk.

2. The recording device according to claim 1, wherein the recording device determines the apparent risk based on a steering angle or an acceleration of the vehicle, and determines the potential risk based on an image recognition of the in-vehicle images.

3. The recording device according to claim 2, wherein the second behavior corresponding to the potential risk includes at least one of inattentive driving, driving while the steering wheel is released from a hand for a predetermined time, or a predetermined time operation of a mobile phone.

4. A recording method comprising:
receiving ambient images of a vehicle from an ambient imaging device, and receiving in-vehicle images of the vehicle from an in-vehicle imaging device to record the ambient images and the in-vehicle images in a recorder, the ambient imaging device generating the ambient images of the vehicle in time series, the in-vehicle imaging device generating, in time series, the in-vehicle images including an image of an occupant of the vehicle;
selecting, by a recording device, a first image from the recording images, the recorded images including the ambient images recorded in the recorder and the in-vehicle images recorded in the recorder, the first image indicating a first behavior corresponding to an apparent risk to the vehicle, the first behavior including the least one of a behavior of the vehicle or a behavior of the occupant of the vehicle, and the apparent risk corresponding to a behavior change of the vehicle;
selecting, by the recording device, a second image from the in-vehicle images recorded in the recorder, the second image indicating a second behavior corresponding to a potential risk stemming from a behavior of the occupant of the vehicle, the potential risk not corresponding to the behavior change of the vehicle, the second behavior being classified into one of a first risk level or a second risk level different from the first risk;
displaying, on a display, the second image of the second behavior corresponding to the second risk level of the potential risk; and
controlling not to display the second image corresponding to first risk level of the potential risk.

5. The image display method according to claim 4, wherein the apparent risk is determined based on a steering angle or an acceleration of the vehicle, and the potential risk is determined based on an image recognition of the in-vehicle images.

6. The image display method according to claim 5, wherein the second behavior corresponding to the potential risk includes at least one of inattentive driving, driving while the steering wheel is released from a hand for a predetermined time, or a predetermined time operation of a mobile phone.

* * * * *